United States Patent [19]

Coppola

[11] 4,246,525

[45] Jan. 20, 1981

[54] MOTOR CONTROL SYSTEM

[75] Inventor: Vincent G. Coppola, Branford, Conn.

[73] Assignee: Pitney Bowes Inc., Stamford, Conn.

[21] Appl. No.: 970,523

[22] Filed: Dec. 18, 1978

[51] Int. Cl.³ .............................................. H02P 3/10
[52] U.S. Cl. .................................. 318/612; 318/373; 318/763
[58] Field of Search ............... 318/373, 374, 703, 612, 318/763, 764, 613

[56] References Cited

U.S. PATENT DOCUMENTS

| | | | |
|---|---|---|---|
| 3,541,418 | 11/1970 | Agin et al. | 318/612 |
| 3,958,163 | 5/1976 | Clark | 318/373 |
| 3,995,208 | 11/1976 | Parr | 318/612 |
| 4,129,815 | 12/1978 | Argentine | 318/601 |

Primary Examiner—B. Dobeck
Attorney, Agent, or Firm—Mark Levy; William D. Soltow; Albert W. Scribner

[57] ABSTRACT

A system for accurately stopping a motor operated positioning device permits satisfactory motor tolerance limits for economical production by incorporation of a processor controlled motor plugging routine. The plugging routine includes an initial reverse polarity pulse to the motor of a duration sufficient to brake an ideal motor operating in the device. To accommodate motor characteristics within tolerance limits, a plurality of alternating bursts of positive and reverse polarity are applied to the motor following the initial pulse. Each of the alternating bursts is for a duration less than the system response time.

14 Claims, 8 Drawing Figures

MOTOR CONTROL SYSTEM

BACKGROUND OF THE INVENTION

1. Field of the Invention

The present invention relates generally to motor braking systems and more specifically to a plugging routine for accurately stopping a motor operated positioning device.

2. Brief Description of the Prior Art

Various devices have been proposed heretofore for the purpose of providing greater accuracy in stopping electrical motors operating in positioning devices. In many systems such as that disclosed in U.S. Pat. No. 3,694,671 wherein a fluid motor in earth moving equipment was considered, a single reverse polarity pulse was applied in response to termination of a signal operating the equipment in a selected direction. It should be appreciated that in such system, the duration of the reverse polarity pulse was fixed by a resistance-capacitance network; and therefore the timing could not adequately accommodate variations in equipment inertia. Thus, for example with the equipment moving a heavy load, there was a tendency for continued system movement even after the reverse pulse.

A further approach toward motor braking in a positioning device was illustrated in U.S. Pat. No. 3,995,208. In this apparatus a cyclic drive signal was applied to a motor and braking pulses were provided by shunting the motor terminals. The duration of the braking (shunting) pulses was controlled by a position responsive feedback network which controlled the operation of variable cycle timers. It should be appreciated that this prior system involved a significant degree of complexity because signals representative of the desired position and the present position were required to be differentiated and used for timer control. Thus, system cost was considerable and probably offset any advantage which might be obtained through the use of motors having relatively narrow tolerance limits in conjunction with a fixed duration shunt period.

Applicant had encountered, in the design of postage meter setting devices, substantial problems in providing an accurate yet economical motor braking system which could quickly position a meter setting lever.

Incorporation of feedback circuitry monitoring the exact position of the device and providing a corresponding braking signal dependent on such position involved additional costs and did not necessarily promote rapid braking cycles. On the other hand, the employment of a reverse polarity or shunting cycle fixed duration to a motor did not permit sufficient latitude for practical mass production motor tolerance limitations, thereby manadating high motor costs.

With practical motor tolerance limits it would have been necessary to determine the cycle time to halt the positioning device for each individual unit and employ a plugging cycle of the determined cycle time, which technique was highly impractical.

SUMMARY OF THE INVENTION

The present invention relates to a motor braking system for accurately halting a motor driven positioning device such as a postage meter setting device at the desired position.

A system processor which controls the meter setting device initiates a plugging routine upon detection of the approach of the desired position. The plugging routine includes an initial reverse polarity pulse to a driving motor of the meter setting device for a base period. The base period duration is determined as a valve dependent upon system inertia under ideal conditions.

Subsequent coasting of the motor is retarded, and the system thereby accommodates relatively wide motor tolerance limits by providing a plurality of alternating bursts of positive and negative polarity to the motor following the base pulse with each of the alternating bursts being of a duration less than the system response time.

From the above compendium, it will be appreciated that it is an object of the present invention to provide a motor control system of the general character described which is not subject to the disadvantages aforementioned.

A further object of the present invention is to provide a motor control system of the general character described which provides accurate stopping of motor operated positioning devices.

Yet another object of the present invention is to provide a motor control system of the general character described which incorporates a predetermined plugging routine for stopping motors falling within commercially practical tolerance ranges.

Another object of the present invention is to provide a motor control system of the general character described which is well adapted for employment in postage meter setting devices.

A further object of the present invention is to provide a motor control system of the general character described which promotes economical fabrication of motor driven positioning devices.

Other objects of the invention in part will be obvious and in part will be pointed out hereinafter.

With these ends in view, the invention finds embodiment in certain combinations of elements and arrangements of parts and series of steps by which the said objects and certain other objects are hereinafter attained, all as fully described with reference to the accompanying drawings and the scope of which is more particularly pointed out and indicated in the appended claims.

BRIEF DESCRIPTION OF THE DRAWINGS

In the following drawings in which is shown one of the various possible exemplary embodiments of the invention.

DESCRIPTION OF THE PREFERRED EMBODIMENT

Figure 1:
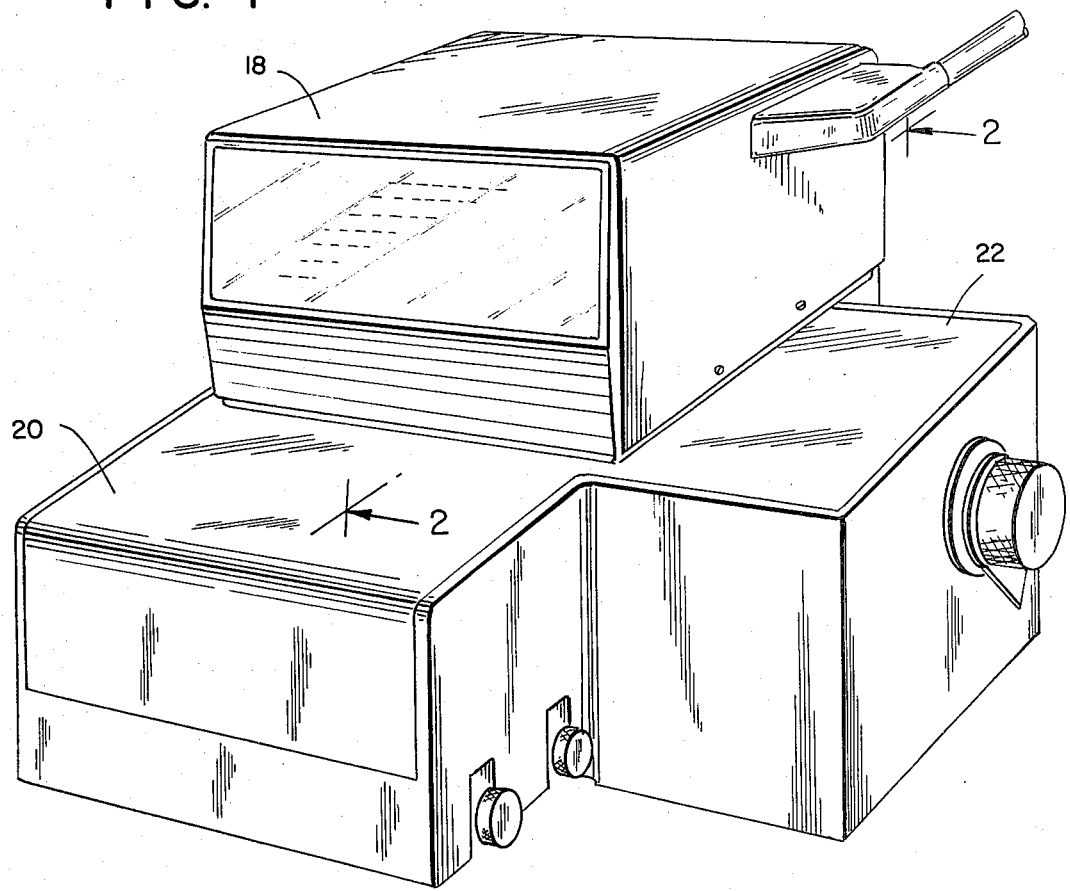
FIG. 1 is a perspective illustration of a typical postage meter station as may be employed in an automated mailing system and including a meter setting device having a plurality of motors which are controlled in accordance with the motor control system of the present invention.

Referring now in detail to the drawings, reference numeral 10 denotes an automated mailing system which generally comprises a system processor such as a Rockwell 4/1 which is programmed for the calculation of postage charges dependent upon article weight and transportation class and/or destination data. The mailing system 10 includes a scale 14 for providing article weight information to the processor 12 and an operator keyboard 16 through which transportation class and destination data is received. The processor 12 may calculate the appropriate transportation charges for the weight of an article placed upon the scale 14 by reference to a transportation charge rate table stored in a rate memory similar to that illustrated in U.S. Pat. No. 3,692,988 issued to Dlugos et al on Sept. 9, 1972 and assigned to the assignee of the present invention.

Upon obtaining the proper postage for transportating the article to the desired location, the processor 12 transmits an appropriate command signal to a meter setting device 18.

As shown in FIG. 1, the meter setting device 18 is positioned above and in engagement with a postage meter 20 which may comprise, for example, a Pitney Bowes Series 5300 meter. Additionally shown in FIG. 1 is a remote meter resetting system 22 adapted for resetting the registers of the meter 20 after debiting the user's account as described in U.S. Pat. No. 3,664,231 issued to Hanson on May 23, 1972 and assigned to the assignee of the present invention.

Figure 2:
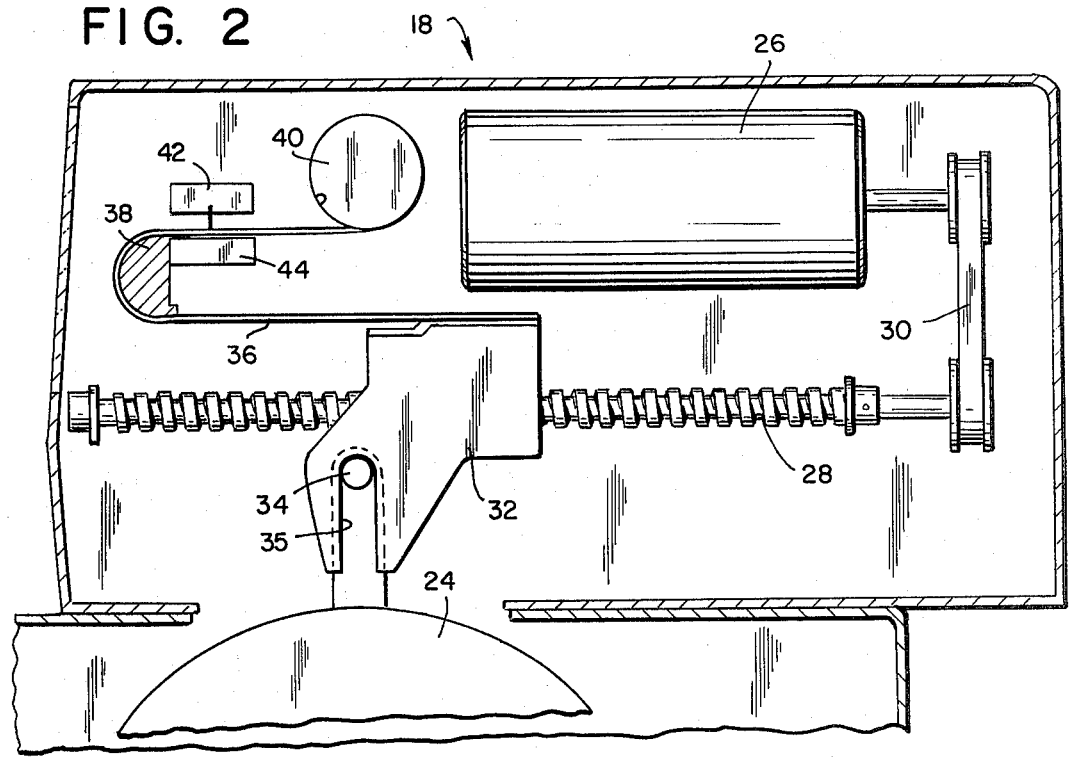
FIG. 2 is a fragmentary sectional view through the meter setting device and a segment of a postage meter controlled thereby with portions deleted for clarity and showing the engagement between the meter setting device and a meter setting lever.
Figure 4:
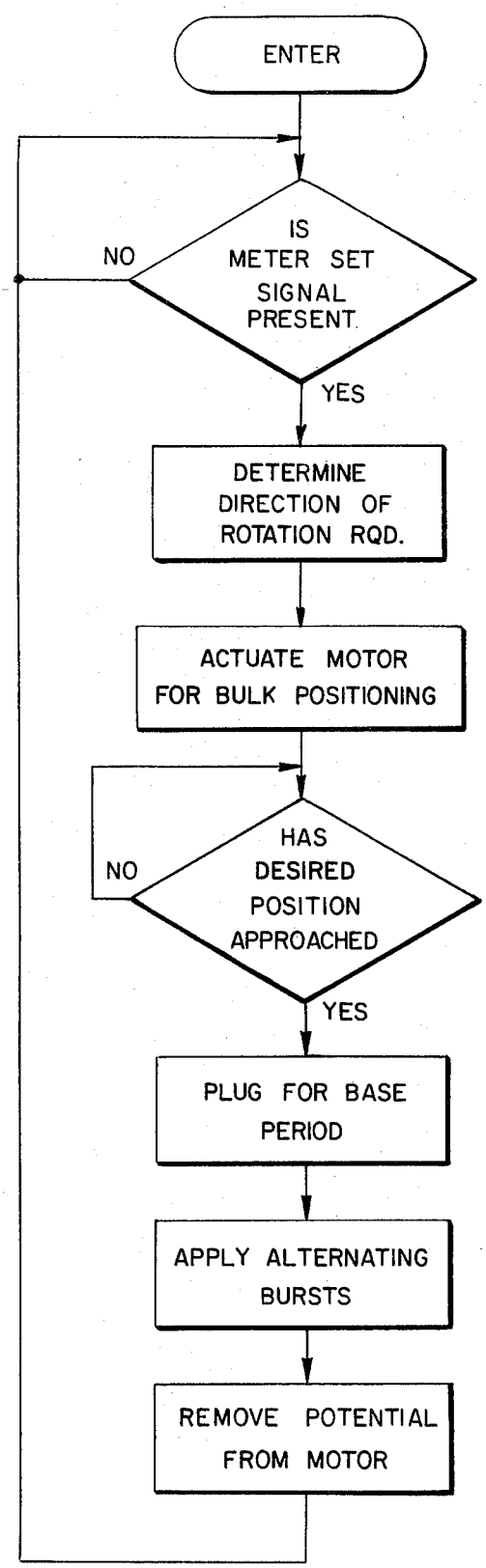
FIG. 4 is a flow diagram of a typical system processor routine pursuant to which the motors of the meter setting device are controlled and including a plugging subroutine pursuant to which the meter setting device is accurately stopped at the desired meter settings.
Figure 3:
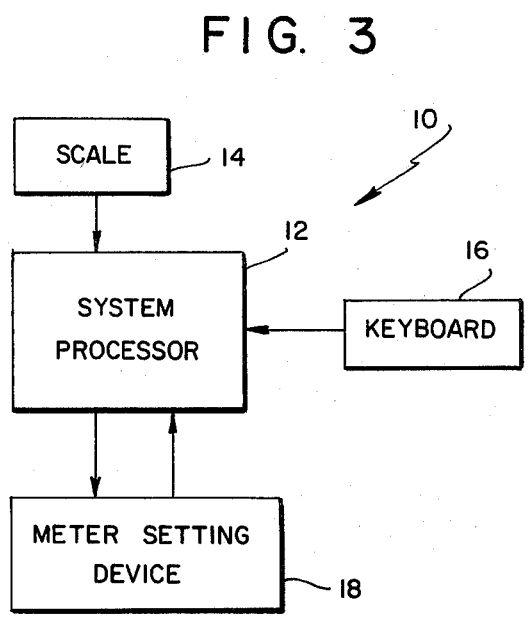
FIG. 3 is a block diagram illustrating the interaction between components of the automated mailing system including a system processor and the meter setting device.

The relative position of components of the meter setting device 14 are depicted in FIG. 2 wherein mounting members and other details have been deleted for clarity. In addition, the present invention will be described hereinafter with reference to the control of a single meter setting lever 24, while in actuality the meter 20 includes a plurality of levers each adapted to vary the print setting of different decimal denominations of postage to be printed.

The meter setting device 19 includes a bidirectional DC motor 26 for controlling the position of the meter setting lever 24. The motor 26 rotates to actuate a lead screw 28 through a low mass drive belt and pulley system 30. Rotation of the lead screw 28 causes a carrier nut 32 to translate while maintaining engagement with the meter setting lever 24 through a lever tip 34 which is engaged in a clevis 35 of the carrier nut.

With a DC voltage of one polarity applied to the motor 26, rotation of the motor will cause translational movement of the carrier nut 32, hence the meter setting lever 24, in one direction while actuation of the motor through the application of an opposite polarity voltage will cause the motor to rotate in the opposite direction and the carrier nut to translate in the opposite direction. Movement of carrier nut 32 which is in engagement with the meter setting lever 24 changes the setting of a postage meter print wheel through a gearing system (not shown).

The position of the carrier nut 32 is monitored and appropriate signals transmitted to the system processor 12 through an encoded tape 36, one end of which is fixed to the carrier nut 32. Intermediate its ends, the tape 36 extends around a guide 3B and its opposite end is secured to a take-up reel 40. If the tape is encoded with a plurality of position indicating apertures, a suitable position detecting device such as a light source 42 and a photodetector 44 may be employed. Alternatively, the tape may be magnetically encoded, and a magnetic reading head utilized. The meter setting device 18 includes a like motor driven carrier nut and position detector system for each of the meter setting levers of the postage meter 20.

Upon determining the amount of postage to be printed, the processor 12 retrieves data indicating the last position of each of the meter setting levers and then determines the direction of movement of such levers which is required to indicate the amount of postage which is desired to be imprinted. The last position of the postage printing levers is stored as a signal representative of the position of the carrier nut 32 sensed from the encoded tape 36. With the last position known and the desired postage known, the processor then determines the direction and amount of movement necessary for each of the printing levers and provides a command signal to each of the motors for rotation in the required directions.

Figure 7:
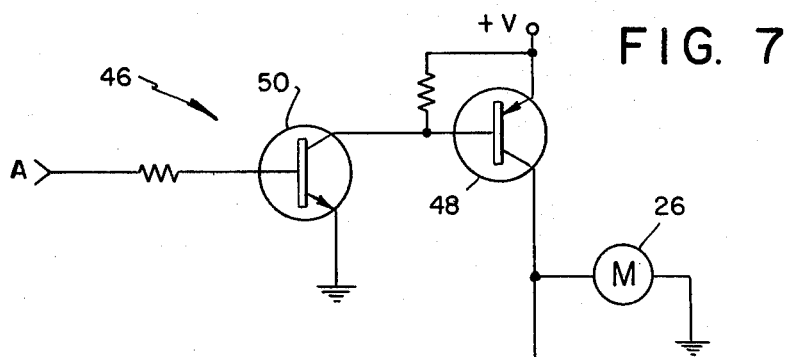
FIG. 7 is a circuit diagram of a typical motor driver circuit for actutation of a motor of the meter setting device during the meter setting routine.

Referring now to FIG. 7 wherein a driver circuit 46 for operating the motor 26 is depicted, it will be seen that the driver circuit 46 employs two input terminals designated A and B which receive the command signal comprising either high or low logic level signals from the processor 12.

A positive power transistor 48 interconnects a terminal of the motor 26 with the positive potential power supply through its emitter collector circuit with the base of the positive power transistor 48 being selectively grounded for conduction through the emitter collector circuit of a driver transistor 50. The driver transistor 50 is conductively biased in the presence of a high logic signal at the driver circuit input terminal A.

Figure 8:
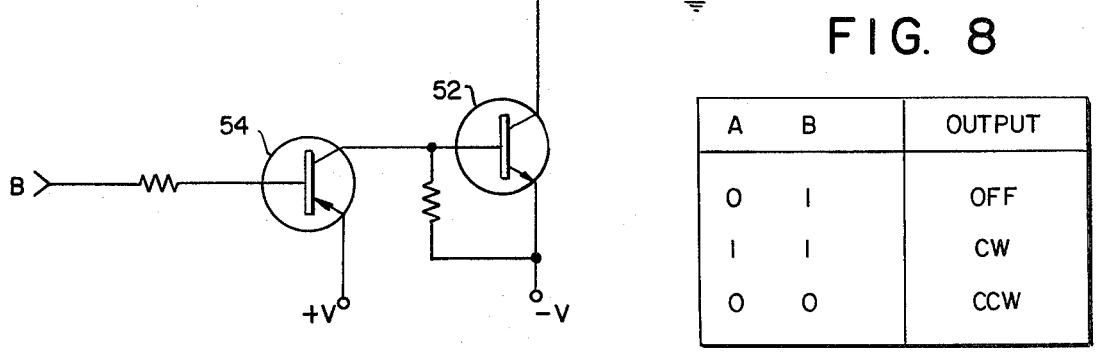
FIG. 8 is truth table illustrating the various motor outputs in response to logic level inputs to the driver circuit.

As shown in the truth table of FIG. 8, in order to provide clockwise motor rotation, the input terminal A is made high, while the input to the terminal B of the driver circuit 46 is also high. The high input to terminal B turns off a negative power transistor 52, the emitter collector of which interconnects the terminal of the motor 26 and a source of negative power potential. It should be appreciated that the negative power transistor 52 is nonconductive when its base is negatively biased through a resistor interconnecting its base and emitter. A driver transistor 54 which is biased by the logic input at B is operative to positively bias the negative power transistor into conduction in the presence of a low input at B. Thus, with high logic level inputs at terminals A and B of the driver circuit, the motor terminal will be connected with the positive potential power supply and the negative potential power supply will be disconnected.

In order to apply reverse potential to the motor 26, both terminal inputs A and B are supplied with low logic levels. In such instance, the emitter collector circuit of the positive driver transistor 50 will be nonconductive, and therefore, the positive power transistor 48 will be nonconductive. On the other hand, a low logic level at input B will result in conduction through the emitter collector circuit of the negative driver transistor 54 which will bias the negative power transistor 52 into conduction, thereby interconnecting the motor with a reverse polarity power potential to generate an opposite driving torque.

As previously mentioned, the processor 12 will provide appropriate logic signals along the input lines of the driver circuit of each motor to cause movement of the respective carriage nuts in the appropriate direction towards the desired meter setting lever position. Upon detection of the approach of the carriage nut to the desired position by the photodetector 44, a signal is generated to initiate a plugging subroutine in accordance with the present invention.

The plugging subroutine provides economical and commercially feasible motor tolerance limits yet assures the precise positioning of the carriage nut by rapidly braking the motor 26. In accordance with the invention, the motor is plugged, i.e. a polarity reverse to the polarity under which the motor is presently operating is applied to the motor to generate a reverse torque breaking force. The initial or base period of plugging is determined in an inertia system characterized by a motor operating in the device 18 under ideal conditions and with ideal characteristics, and the base period is the period of plugging required to stop the system. This determination may be made empirically. A typical base period for motor plugging which has been determined for motors operating in the meter setting device 18 has been in the order of 10 milliseconds.

In order to accommodate motors which vary in operating characteristics yet remain within practical tolerance limits, the plugging subroutine includes a rapid succession of opposite polarity voltage bursts to reduce motor coasting after the initial base plugging period. The alternating bursts are desirably each limited to a period less than the system response time so that continued application of the cyclic bursts will not generate any movement in the system. The system response time for the application of the cyclic bursts can also be empirically determined and, for example, an adequate burst duration less than the meter setting device response time has been found to be in the order of 1.5 milliseconds. Further, it has been determined that satisfactory results to accommodate practical motor tolerance limits have been obtained with approximately 5 to 10 cycles of alternating bursts. While additional cyclic bursts do not provide movement, they do not reduce stopping time and present unnecessary stall torque loads on the motor 26.

Figure 5:
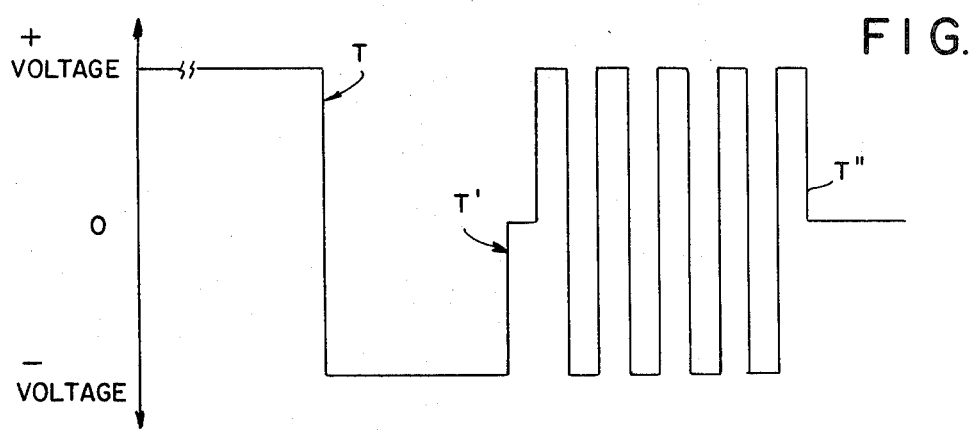
FIG. 5 is a graphic representation of voltage levels applied to a typical motor of the meter setting device prior to and during the plugging subroutine.

Referring now to FIG. 5 wherein a graphic representation of voltage applied to the motor 26 versus time is shown, an initial duration of positive voltage has been applied to the motor 26 to produce full speed rotation for bulk positioning of the carrier nut, hence the meter setting lever. Upon detection of the approach to the desired meter setting lever position, the photodetector 44 provides a signal to the processor at a time T indicated in FIG. 5 which initiates the plugging subroutine whereby the polarity of the voltage applied to the motor is reversed. This reverse polarity is maintained for the predetermined base period until a time T' after which the plurality of alternating voltage bursts are applied until a time T". The successive alternating bursts are effective for motors operating within tolerance limits to completely halt such motors at or before T", the termination of the plugging subroutine. In the meter setting device 18 it has been found that a total stopping time for the entire plugging subroutine including the base period and the alternating bursts in the order of 30 milliseconds has been sufficient to stop the meter setting device.

Figure 6:
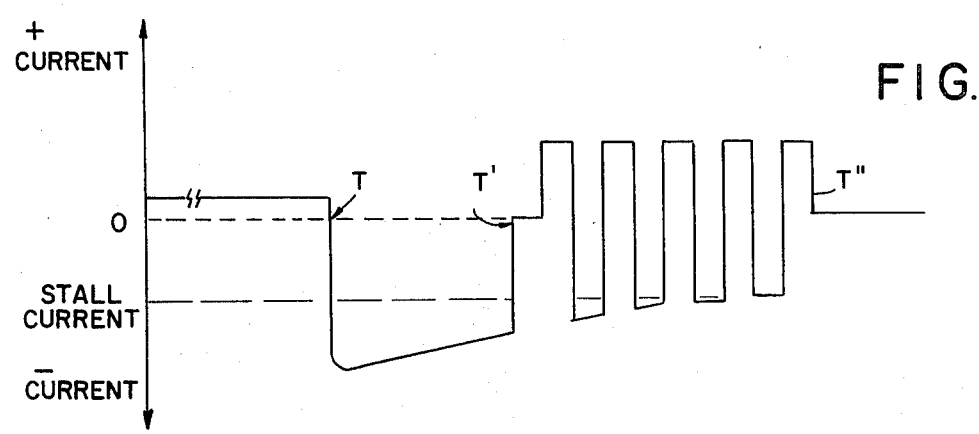
FIG. 6 is a graphic representation of motor current for like periods registered with the voltage levels depicted in FIG. 5.

In FIG. 6 a graphic representation of motor current during the corresponding time intervals depicted in FIG. 5 is shown. It should be appreciated that, upon each instance of the application of reverse polarity, motor stall current is applied for braking. In addition, when the motor 26 is still rotating in its original direction, back EMF current (generated by motor armature rotation) is also drawn for braking torque. While the motor slows to a halt, the current passing through the motor on each successive reverse polarity portion of the plugging subroutine gradually decreases until the motor halts and only stall current passes through the motor during the application of each alternating burst. Thus, due to back EMF current, the initial braking base period and portions of all the subsequent reverse polarity bursts wherein the motor is still in motion provides additional increments of motor braking torque beyond the stall current torque.

Because the alternating bursts are of a duration less than the response time, they will not result in movement of the motor in either direction, however while the motor is coasting to a halt, the bursts of opposite polarity do provide additional braking torque due to the absorption of back EMF current.

Once the plugging cycle times have been determined, i.e. the length of plugging base period and the number and duration of bursts, the plugging subroutine is fixed for all units and is applied to motors falling within the preselected tolerance limits. This procedure permits relatively wide latitude with regard to motor tolerance limits and avoids the requirement of providing a motor braking system having position feedback elements or a motor braking system which must be preset for each individual unit.

It should be appreciated that, while the invention has been described with reference to braking a motor operating in a clockwise mode with a negative potential for braking, The procedure is identical with respect to braking a motor which is operating in a reverse mode through the application of a positive potential.

Thus, it will be seen that there is provided a motor control system which achieves the various objects of the present invention and which is well adapted to meet the conditions of practical use.

As various changes might be made in the system as above set forth, it is to be understood that all matter herein described or shown in the accompanying drawings is to be interpreted as illustrative and not in a limiting sense.

Having thus described the invention, there is claimed as new and desired to be secured by Letters Patent:

1. A motor control system comprising means for selectively applying an electrical voltage of a first polarity to a motor to drive the motor in a first mode of operation, means for selectively applying an electrical voltage of an opposite polarity to the motor to operate the motor in the opposite mode, means providing a signal for stopping the motor when the motor is operating in one of the modes, means receiving the stopping signal and in response thereto discontinuing the application of one electrical polarity to the motor and initiating the application of the other electrical polarity to the motor for a base period greater than the motor response time and thereafter alternating the application of the first and opposite electrical polarities for durations of less than the response time of the motor whereby the motor is rapidly stopped.

2. A motor control system constructed in accordance with claim 1 further including a motor and a positioning device, the motor driving the positioning device.

3. A motor control system constructed in accordance with claim 2 wherein the positioning device comprises a meter setting device, the meter setting device including a lead screw and a carriage nut, the carriage nut being threadingly engaged on the lead screw and drive means interconnecting the motor and the lead screw.

4. A method for stopping a DC motor having operating characteristics within a tolerance range of specified operating characteristics comprising the steps of:
 (a) determining the motor plugging time required to stop a like motor having the specified operating characteristics,
 (b) determining the response time of the like motor to an applied electrical potential equivalent to the motor running potential,
 (c) plugging the motor for the determined plugging time, and
 (d) subsequently applying cyclic electrical potentials of alternating polarity to the motor, each of which is for a duration not greater than the determined response time.

5. A method for stopping a DC motor as set forth in claim 4 wherein a predetermined number of alternating polarity cycles are applied.

6. A method for stopping a DC motor as set forth in claim 4 wherein the motor plugging time is empirically determined.

7. A method for stopping a DC motor as set forth in claim 4 wherein the motor response time is empirically determined.

8. A method for stopping a DC motor as set forth in claim 4 further including a positioning device driven by the motor, the plugging time being determined on the basis of the inertia of the motor and the components driven thereby.

9. A method for stopping a DC motor as set forth in claim 4 further including a positioning device driven by the motor, the response time being determined on the basis of the mass of motor and the components driven thereby.

10. A method for stopping a motor having operating characteristics within a tolerance range of specified operating characteristics comprising the steps of:
 (a) plugging the motor for a predetermined duration greater than the response time of a motor having the specified operating characteristics, and
 (b) applying a predetermined number of cyclic pulses of alternating polarity to the motor, each of which is for a duration not greater than the response time of a motor having the specified operating characteristics.

11. A method for stopping a motor as set forth in claim 10 wherein the plugging duration is equivalent to the plugging time required to stop a motor having the specified operating characteristics.

12. A motor control system comprising means for selectively applying an electrical voltage of a first polarity to a motor to drive the motor in a first mode of operation, means for selectively applying an electrical voltage of an opposite polarity to the motor to operate the motor in the opposite mode, means providing a signal for stopping the motor when the motor is operating in one of the modes, means receiving the stopping signal and in response thereto discontinuing the application of one electrical polarity to the motor and initiating the application of the other electrical polarity to the motor, said other electrical polarity being applied to said motor for a base period greater than the motor response time and thereafter alternating the application of the first and opposite electrical polarities respectively for time periods of less than the response time period of the motor whereby the motor is rapidly stopped.

13. A motor control system comprising means for selectively applying an electrical voltage of a first polarity to a motor to drive the motor in a first mode of operation, means for selectively applying an electrical voltage of an opposite polarity to the motor to operate the motor in the opposite mode, means providing a signal for stopping the motor when the motor is operating in one of the modes, means receiving the stopping signal and in response thereto discontinuing the application of one electrical polarity to the motor and initiating the application of the other electrical polarity to the motor for a base time period greater than the motor response time period and thereafter alternating the application of the first and opposite electrical polarities respectively such that each application thereof is for a time period of less than the response time period of the motor whereby the motor is rapidly stopped.

14. A motor control system comprising means for selectively applying an electrical voltage of a first polarity to a motor to drive the motor in a first mode of operation, means for selectively applying an electrical voltage of an opposite polarity to the motor to operate the motor in the opposite mode, means providing a signal for stopping the motor when the motor is operating in one of the modes, means receiving the stopping signal and in response thereto discontinuing the application of one electrical polarity to the motor and initiating the application of the other electrical polarity to the motor, said other electrical polarity being applied to said motor for a base time period greater than the motor response time period and thereafter alternating the application of the first and opposite electrical polarities respectively such that each application thereof is for a time period of less than the response time period of the motor whereby the motor is rapidly stopped.

* * * * *